United States Patent [19]
Cluff

[11] 4,079,170
[45] Mar. 14, 1978

[54] WAX SATURATED EXPANDED POLYSTYRENE AND METHOD OF MANUFACTURE

[76] Inventor: Carwin B. Cluff, 5525 N. Grande, Tucson, Ariz. 85704

[21] Appl. No.: 813,947

[22] Filed: Jul. 8, 1977

[51] Int. Cl.$^2$ .............................................. B32B 3/26
[52] U.S. Cl. ................................... 428/484; 427/244; 427/385 B; 428/311; 428/321
[58] Field of Search ............... 428/310, 311, 321, 484; 427/244, 384, 385 B

[56] References Cited

U.S. PATENT DOCUMENTS

| 3,661,674 | 5/1972 | Higgs et al. | 428/311 |
| 3,949,137 | 4/1976 | Akrongold et al. | 428/311 |

Primary Examiner—William J. Van Balen
Attorney, Agent, or Firm—Warren F. B. Lindsley

[57] ABSTRACT

Wax saturated expanded polystyrene or other type of open-cell foamed product and method of manufacture for increasing its surface and/or body compressive and tensile strengths rendering the resulting product effective as a building material.

7 Claims, 4 Drawing Figures

WAX SATURATED EXPANDED POLYSTYRENE AND METHOD OF MANUFACTURE

BACKGROUND OF THE INVENTION

This invention relates to expanded polystyrene foam products or other open-cell foam products which are useful in the preparation of lightweight building materials, such as insulation boards and the like, and more particularly to expanded polystyrene foam products having open cells or spaced beads of polystyrene wherein the material is impregnated with paraffin, candelilla, montan and other types and blends of waxes to increase the product's density and both its compressive and tensile strengths thereby rendering it resilient, waterproof, and weatherproof at relatively low cost.

DESCRIPTION OF THE PRIOR ART

Foamed resins have gained wide acceptance in recent years for the manufacture of lightweight articles; such articles are obtained by foaming the resin or expanding and fusing beads within a mold. These foam articles have little strength and their resistance to abrasion and wear leaves much to be desired. While some attempts have been made to laminate such products such as polyurethane foam to materials having better wear characteristics, these attempts have not always been successful because of the difficulty in recurring good adhesion between a thermoplastic film or sheet and the porous inert underlying polyurethane foam layer.

Low density foam formulations and processing techniques are readily available; however, the physical properties, i.e. tensile strength, tear strength and compression, deflection behavior and water absorption displayed by these lighter foams are unacceptable for some commercial applications and higher density closed-cell extruded foams are too expensive to be economically attractive.

It would be desirable to saturate a low density foam product to increase its density and improve its physical properties so that it can be used, for example, as a building material such as an insulation board.

The prior art discloses the impregnation of various kinds of foam materials with various substances.

The Turkewitsch U.S. Pat. No. 3,503,822 discloses a polyurethane foam which is impregnated with a thermoplastic substance.

U.S. Pat. Nos. 3,876,221; 3,944,204; and 2,955,056 to Chant, Dirks and knox, respectively, disclose various thermosetting resins which may be impregnated into various open-cell foamed structures.

U.S. Pat. No. Re. 21,311 describes a waterproofing technique wherein wax is employed as the impregnant.

None of these patents disclose a composite product formed by the impregnation of a cellular low density product with wax. One such low density product is expanded polystyrene which when pressure impregnated with thermosetting wax forms a resilient, highly wear-resistant, water and weatherproof board that may serve many building needs, such as, for example, an insulating means which may be readily cut to size and nailed in place.

SUMMARY OF THE INVENTION

In accordance with the invention claimed, a new and improved composite product is provided comprising an expanded polystyrene foam impregnated with wax to any desired degree to obtain a useful, water and weatherproof product that is resilient, easy to cut and nail in place when used as a building material. The material can also be used as a floating barrier on water to prevent evaporation loss as well as conserve energy, for example, on swimming pools.

It is, therefore, one object of this invention to provide a new durable, insulated construction material formed from inexpensive readily available material.

Another object of this invention is to provide a composite material formed from wax and expanded polystyrene.

A further object of this invention is to provide a new method of waterproofing and weatherproofing expanded polystyrene so that the material can be used, for example, as a floating water vapor and energy barrier.

A still further object of this invention is to provide new composite products formed by wax impregnating a low density open cellous product of types other than expanded polystyrene. The properties of the composite product can be controlled by adjusting either the amount or type of wax added.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
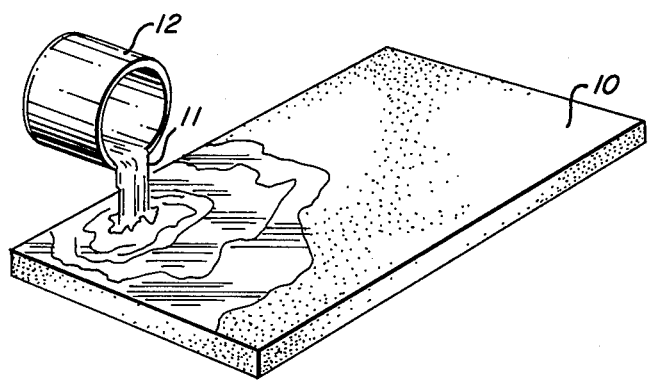
FIG. 1 is a perspective illustration of a sheet of foamed polystyrene or other type of open cellular product being impregnated with a thermosetting wax.
Figure 2:
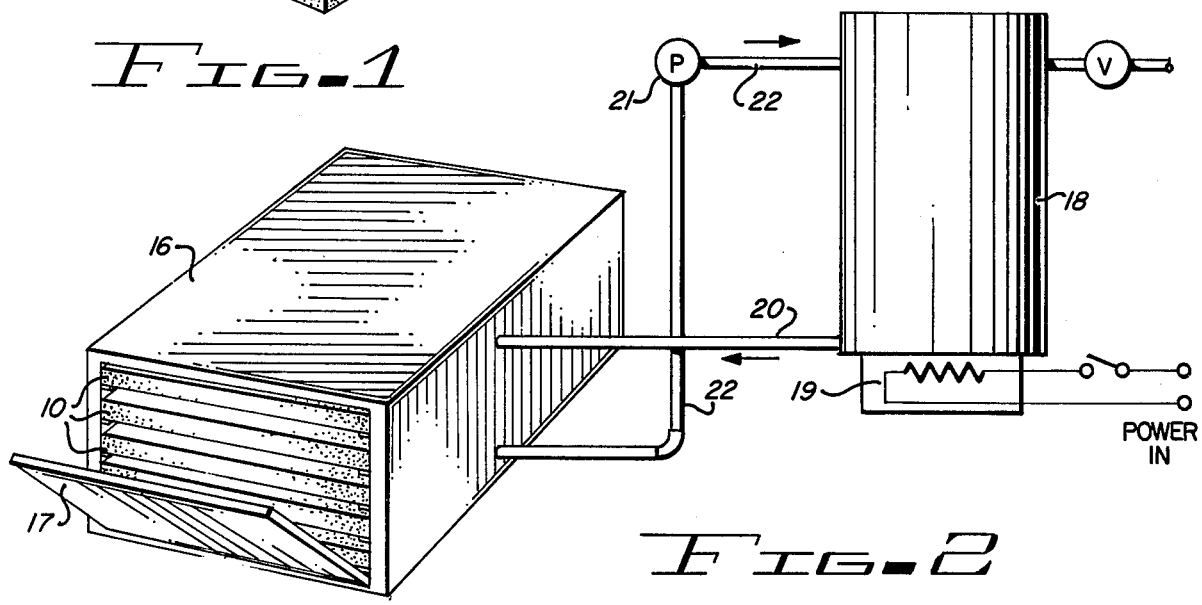
FIG. 2 is a perspective illustration of the pressurizing vessel and heating system to provide liquid wax.
Figure 3:
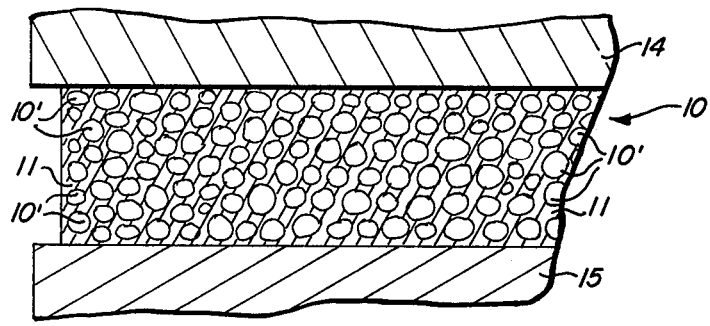
FIG. 3 is a cross-sectional view of the impregnated foamed polystyrene sheet or other type of cellular product of FIG. 1 compressed between a pair of molding plates.
Figure 4:
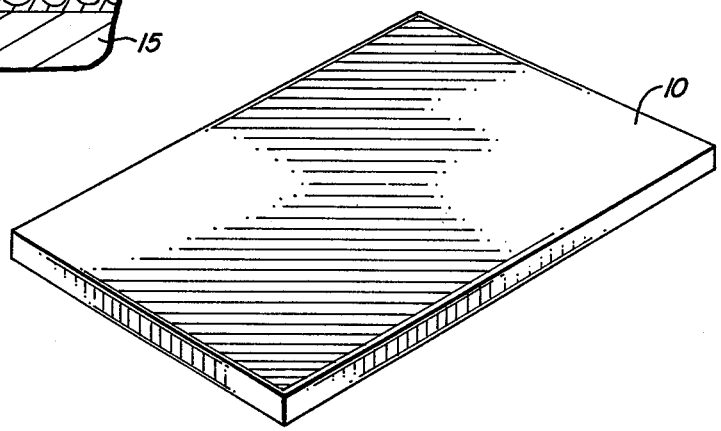
FIG. 4 is a perspective view of one finished saturated polystyrene sheet or other type of cellular product.

Referring more particularly to the drawing by characters of reference, FIG. 1 discloses a sheet 10 of a foamed cellular low density product such as, for example, a sheet of polystyrene having either open cells or spaced beads of polystyrene 10'. A supply 11 of non-foaming thermosetting paraffin, candelilla, montan or other type or blend of wax is provided from a source 12. The sheet 10 covered and at least partly impregnated with the liquid wax is either placed in a closed vessel-like apparatus 13 under pressure and impregnated with wax in a known manner, as shown in FIG. 2, or compressed between molding plates 14 and 15, as seen in FIG. 3. The wax is cured or hardened by cooling the sheet while it is under pressure, if so desired, or cured or hardened at atmospheric pressure once it is impregnated to the predetermined amount.

Upon curing or hardening, the sheet retains substantially its original thickness with the void spaces filled with wax. The resulting article may be flat or any other shape depending on the original shape of the initial unsaturated article.

As shown in FIG. 2, the vessel-like apparatus 13 comprises a chamber 16 which may be horizontally positioned for receiving one or more sheets of material to be impregnated. This chamber is openable from at least one side or end such as end 17 for receiving the sheet or sheets of material 10. For example, one or more spaced 4 foot by 8 foot sheets of a given or different thickness may be spacedly arranged in the chamber or a single sheet up to 18 inches in thickness may be suitably impregnated under pressure.

FIG. 2 further illustrates a further chamber 18 which is heated by a suitable burner 19 for melting a suitable wax product placed therein. The wax in its moltened stage under pressure is then conveyed under pressure through pipe lines 20 to chamber 16 containing sheets 10. The liquid wax is returned to chamber 18 by means of pump 21 through pipe line 22.

It should be noted that the wax in the sheet of polystyrene may be substantially uniformly disposed throughout the article. The intensity of saturation and the firmness of the saturated polystyrene depends on the pressure used in the pressurizing vessel or between the mold plates and the amount and type of liquid wax applied and the length of time the foam is left pressurized in the molten wax.

While the thermosetting liquid wax composition may be clear, i.e. unpigmented and essentially clear, color can be added so that the resulting article may be colored, made reflective, etc.

With relatively small cells, the waxed impregnated polystyrene may obtain a marblized like surface appearing uniform between the cell wall elements or beads of the saturated polystyrene thereby rendering thee wax saturated polystyrene easily cut or machined to fit its various uses.

By utilizing the flexible varieties of waxes and colors, the resulting saturated expanded polystyrene sheet can be substituted for various insulating materials since it can be readily cut and nailed in place and it remains a durable, inexpensive, readily available material. The material can be shipped and seamed together by dipping the edge of the board in molten wax just prior to overlapping with an adjacent sheet. It has waterproofing and weatherproofing characteristics which neither product, the wax or the polystyrene alone, provides. Since the wax is within the insulating polystyrene, it is protected from melting and accordingly, can be exposed to the sun and still retain its weatherproofing properties.

Wax increases the weight of the polystyrene without substantially changing its size and reduces wind and breakage possibilities. This added weight is an essential property to reduce wind damage when the material is used as a floating cover.

Although but few embodiments of the present invention have been emphasized and described, it will be apparent to those skilled in the art that various changes and modifications may be made therein without departing from the spirit of the invention or from the scope of the appended claims.

What is claimed is:

1. A substantially non-porous article comprising:
   a sheet of foamed polystyrene or other cellular material having open, connected cells,
   said sheet having its open cells substantially or entirely filled with a thermosetting wax composition hardened after the wax in a liquid form was forced throughout the sheet under pressure,
   whereby the wax in the polystyrene sheet is substantially uniformly disposed throughout the article.

2. The substantially non-porous article set forth in claim 1 wherein:
   said wax is unpigmented.

3. The substantially non-porous article set forth in claim 1 wherein:
   said wax is pigmented.

4. The substantially non-porous article set forth in claim 1 wherein:
   said sheet is formed of interconnected beads.

5. A method of preparing a substantially non-porous article comprising the steps of:
   impregnating a sheet of foamed polystyrene having open, connected cells under pressure with a thermosetting wax composition in liquid form,
   whereby said wax composition fills the open cells of the sheet, and
   hardening the wax composition while maintaining said sheet of polystyrene under pressure.

6. The method set forth in claim 5 wherein:
   the wax composition substantially entirely fills the open cells of the sheet.

7. The method set forth in claim 6 wherein:
   said sheet of foamed polystyrene is formed of interconnected beads.

* * * * *